US012637861B1

(12) United States Patent
Alshannag et al.

(10) Patent No.: US 12,637,861 B1
(45) Date of Patent: May 26, 2026

(54) REINFORCED CONCRETE STRUCTURE JOINT INCLUDING SMART MEMORY ALLOY BARS AND METHOD OF MANUFACTURING THE SAME

(71) Applicant: KING SAUD UNIVERSITY, Riyadh (SA)

(72) Inventors: Mohamed Jamal Alshannag, Riyadh (SA); Ali Saeed Alqarni, Riyadh (SA); Mahmoud Mohammed Higazey, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/377,364

(22) Filed: Nov. 3, 2025

(51) Int. Cl.
*E04C 5/06* (2006.01)
*C04B 14/06* (2006.01)
(Continued)

(52) U.S. Cl.
CPC ............ *E04C 5/0604* (2013.01); *C04B 14/06* (2013.01); *C22C 19/03* (2013.01); *C04B 2103/32* (2013.01); *C04B 2111/40* (2013.01)

(58) Field of Classification Search
CPC . E04C 5/0604; E04C 5/00; E04C 5/07; E04C 5/0622; C04B 14/06
See application file for complete search history.

(56) References Cited

U.S. PATENT DOCUMENTS 4,209,560 A * 6/1980 Vasilos ................... C04B 33/36
428/114
4,390,583 A * 6/1983 Brazel .................... B28B 1/002
428/113

(Continued)

FOREIGN PATENT DOCUMENTS

CN 103758532 A 4/2014
CN 110359379 A 10/2019
CN 118756842 A 10/2024

OTHER PUBLICATIONS

Construction and building materials. Applications of shape memory alloys in structural engineering with a focus on concrete construction—A comprehensive review by Mohammad Amin Molod https://pdf.sciencedirectassets.com (Year: 2022).*

(Continued)

*Primary Examiner* — Paola Agudelo
(74) *Attorney, Agent, or Firm* — Nath, Goldberg & Meyer; Joshua B. Goldberg

(57) ABSTRACT

A reinforced concrete structure includes a first elongated concrete body extending in a first direction and a second elongated concrete body extending in a second direction, different from the first direction, and connected to the first elongated body. The first concrete body may include a first metallic reinforcement member embedded along its length. The second concrete body may include: a) plurality of second metallic reinforcement members, formed of a smart memory alloy, embedded along its length, and b) at least one third metallic reinforcement member, which may be formed of material other than a smart memory alloy, extending along its length. In a lateral cross-sectional area of the second concrete body, a cross-sectional area of the second and third metallic reinforcement members combined divided by the cross-sectional area of the third metallic reinforcement member ranges from about 3 to about 3.3.

17 Claims, 5 Drawing Sheets

(51) Int. Cl.

| | |
|---|---|
| *C22C 19/03* | (2006.01) |
| *C04B 103/32* | (2006.01) |
| *C04B 111/40* | (2006.01) |

(56) References Cited

U.S. PATENT DOCUMENTS

| | | | | |
|---|---|---|---|---|
| 4,472,331 | A * | 9/1984 | Kida | E04C 5/16 |
| | | | | 264/35 |
| 5,392,580 | A * | 2/1995 | Baumann | E04C 5/04 |
| | | | | 52/646 |
| 6,385,930 | B1 * | 5/2002 | Broms | E04B 5/43 |
| | | | | 52/223.6 |
| 7,421,827 | B1 * | 9/2008 | Konstantinidis | E04C 5/0604 |
| | | | | 52/649.3 |
| 9,540,815 | B2 * | 1/2017 | Lihoshi | E04C 5/0622 |
| 10,034,418 | B1 * | 7/2018 | Tuan | C04B 28/02 |
| 10,619,342 | B2 * | 4/2020 | Zavitz | E04B 1/21 |
| 11,788,314 | B2 * | 10/2023 | Mashal | E04H 9/0237 |
| | | | | 52/167.1 |
| 2005/0257482 | A1 * | 11/2005 | Galluccio | E04C 5/0618 |
| | | | | 52/649.2 |
| 2007/0039276 | A1 * | 2/2007 | Sorensen | E04C 5/0627 |
| | | | | 52/633 |
| 2009/0151298 | A1 * | 6/2009 | Jazzar | E04B 1/164 |
| | | | | 52/745.05 |
| 2017/0051495 | A1 * | 2/2017 | Zavitz | E04C 5/12 |
| 2020/0040564 | A1 * | 2/2020 | Wu | E04B 1/21 |
| 2020/0157006 | A1 * | 5/2020 | Fang | C04B 24/2641 |
| 2021/0115684 | A1 * | 4/2021 | Andrawes | E04G 23/0218 |
| 2022/0056694 | A1 * | 2/2022 | Chiang | E04C 3/34 |
| 2022/0325523 | A1 * | 10/2022 | Rosati | E04C 5/065 |
| 2023/0115539 | A1 * | 4/2023 | Wu | E04C 5/0622 |
| | | | | 52/677 |

OTHER PUBLICATIONS

Higazey, Mahmoud M., Mohammad J. Alshannag, and Ali S. Algarni. "Numerical Investigation on the Performance of Exterior Beam-Column Joints Reinforced with Shape Memory Alloys." Buildings 13.7 (2023): 1801.

Nahar, Mumtasirun, et al. "Numerical seismic performance evaluation of concrete beam-column joint reinforced with different super elastic shape memory alloy rebars." Engineering Structures 194 (2019): 161-172.

Youssef, M. A., M. S. Alam, and M. Nehdi. "Experimental investigation on the seismic behavior of beam-column joints reinforced with superelastic shape memory alloys." Journal of Earthquake Engineering 12.7 (2008): 1205-1222.

* cited by examiner

REINFORCED CONCRETE STRUCTURE JOINT INCLUDING SMART MEMORY ALLOY BARS AND METHOD OF MANUFACTURING THE SAME

TECHNICAL FIELD

The present disclosure relates to concrete structures, and more particularly, to a joint of a reinforced concrete structure that includes smart memory alloy reinforcement bars and a method of manufacturing the same.

DISCUSSION OF THE RELATED ART

Reinforced concrete structures are used in constructing buildings, bridges, tunnels, etc., to name a few applications. Active seismic regions are problematic for reinforced concrete structures, typically at a joint between two structural components, due to the oscillations imparted on the structure from an earthquake. Depending on the severity of an earthquake, reinforced concrete structures tend to exhibit structural damage at joints where two or more members of the structure connect to one another, despite steel bar reinforcement being present at the joint.

Joint damage of a reinforced concrete structure can range from minor in nature (e.g., in the form of minor cracks in the concrete that do not significantly affect the integrity of the joint and the integrity of the structure as a whole, and can be patched), to severe (e.g., a failure of the joint, necessitating demolition).

SUMMARY

The present subject matter relates to a concrete structure that includes smart memory alloy (SMA) bars used in combination with non-smart alloy bars (e.g., steel rebar) as reinforcement at a critical region of a joint between two structural components of the concrete structure. In addition, the present subject matter relates to a method of constructing a concrete structure with smart alloy reinforcement members at the joints thereof.

The inclusion of smart memory alloy bars as reinforcement at a critical area of a concrete structure joint, as taught by this specification, can significantly increase a structure's resistance to an earthquake. As such, any damage to a structure of the present subject matter that results from an earthquake will be significantly lower than the resultant damage from an earthquake in a similar structure that omits smart memory alloy reinforcement bars (i.e., uses steel rebar only for reinforcement), all other parameters of the two structures being the same. A smaller amount of damage to a joint of the structure of the present subject matter will likely require less to no structural repairs to the joint after an earthquake.

The cost of repairing structural damage occurring at or near a joint of a reinforced concrete structure can be quite high. As such, and despite the higher initial cost of using smart memory alloy rebars to construct a joint of a concrete structure as taught by this specification (smart memory alloy bars have a higher cost of procurement than conventional steel rebar), the benefit imparted on the resulting structure when built in an earthquake-prone region will significantly outweigh the up-front cost of using the smart memory alloy bars by eliminating or at least reducing post-earthquake repairs that will be needed by the structure of the present subject matter, as compared to the cost that will be needed to repair a conventional concrete structure that omits smart memory alloy reinforcement after an earthquake.

Importantly, a structure of the present subject matter can save the lives of the occupants thereof by virtue of having a higher resistivity to collapse from an earthquake that would cause a structure of virtually the same structural configuration but that omits smart memory alloys (i.e., uses only rebar for reinforcement).

The ratio of the smart memory alloy bars to the non-smart alloy bars, when included in a concrete structure joint as taught by this specification, increases the strength of the concrete joint in general, and in particular it increases the resistance of the concrete joint in response to earthquake loads, which subject the joint and the entire concrete structure to reverse cyclic loading. This is due to the combination of the self-centering properties of the smart memory alloy bars and the high energy dissipation characteristics of steel rebars.

While the combination of smart memory alloy bars and non-smart alloy bars taught by this specification can be used with (or embedded in) a concrete structure made of any type of concrete, the inclusion of the smart memory alloy bars with or without non-smart alloy bars in a lightweight concrete structure (which includes joints made of lightweight concrete) as taught by this specification further increases the resistivity of the reinforced concrete structure as a whole to earthquake loads due to the high seismic resilience of lightweight concrete.

BRIEF DESCRIPTION OF THE DRAWINGS

The above and other features of the present disclosure will become more apparent by describing in detail exemplary embodiments thereof in conjunction with the accompanying drawings, in which.

DETAILED DESCRIPTION OF THE EMBODIMENTS

Figure 1:
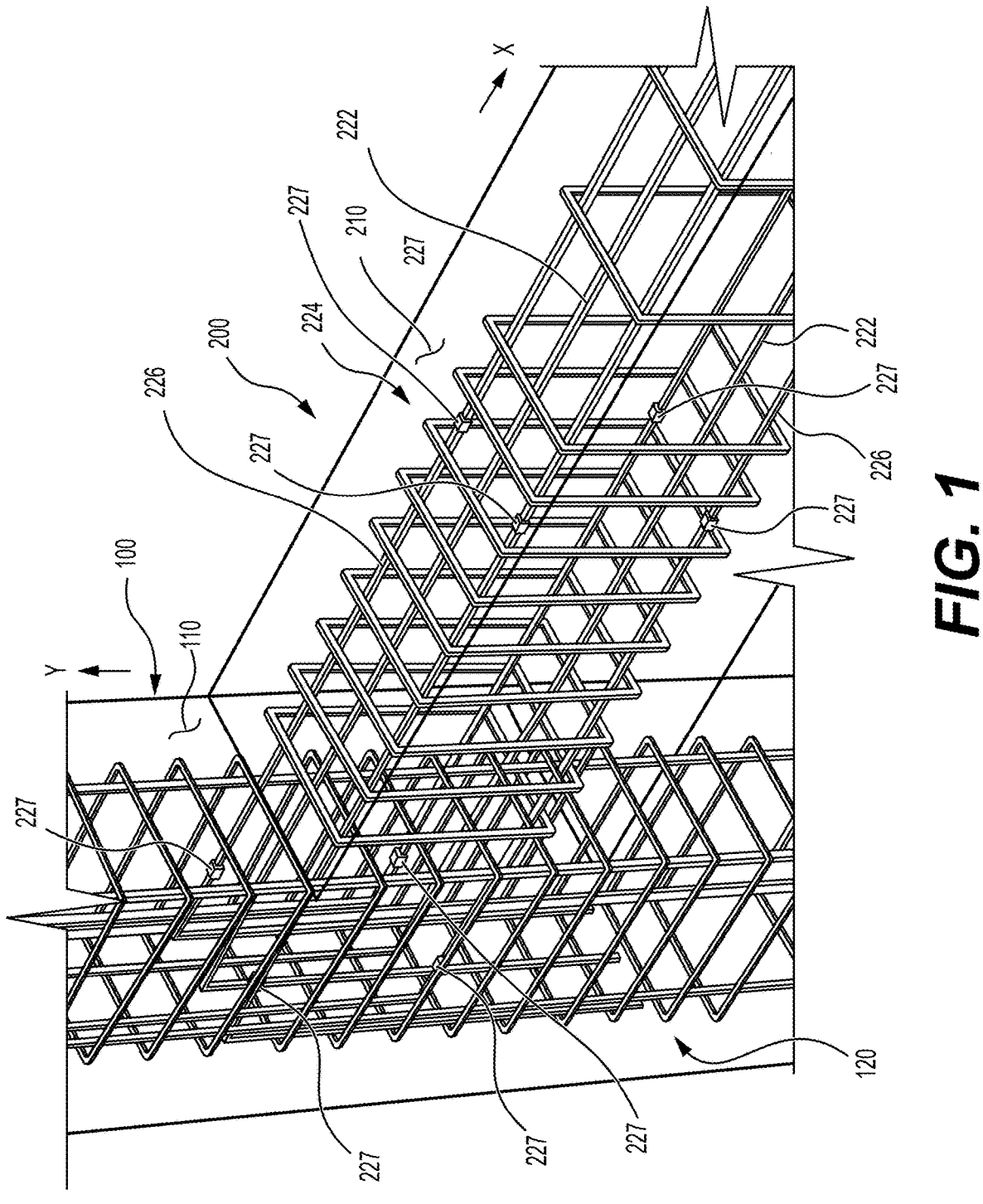
FIG. 1 is a perspective schematic view illustrating a reinforced concrete structure in accordance with an exemplary embodiment of the present subject matter.

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween unless specified otherwise. In addition, elements, components, parts, etc., not described in detail with respect to a certain figure or embodiment may be assumed to be similar to or the same as corresponding elements, components, parts, etc., described in other parts of the specification.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" may include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

FIGS. 1-6 illustrate an exemplary ⅓ scale reinforced concrete structure that can be used for constructing the frame of a building, the frame of a bridge, etc., in a seismic zone. The dimensions illustrated in FIGS. 1-4 are specific to the illustrated structure. However, the scope of the present subject matter is not limited to a reinforced concrete structure having the dimensions illustrated in FIGS. 1-6, and the present subject matter is not limited to the number, size, and/or arrangement of the reinforcing bars illustrated in FIGS. 1-4. The dimensions of the concrete structure, the number of reinforcing bars, the size of the reinforcing bars and the arrangement of the reinforcing bars can be varied as needed consistent with the teachings of this specification.

Referring to FIGS. 1-6, a structure of the present subject matter includes a first structural member 100 extending in a first direction Y (e.g., a vertical direction) and a second structural member 200 extending in a second direction X (e.g., a horizontal direction). The second direction X crosses the first direction Y. For example, the first and second directions Y and X may intersect one another at a 90 degree angle. The first and second structural members 100, 200 are structurally connected to one another.

Figure 2:
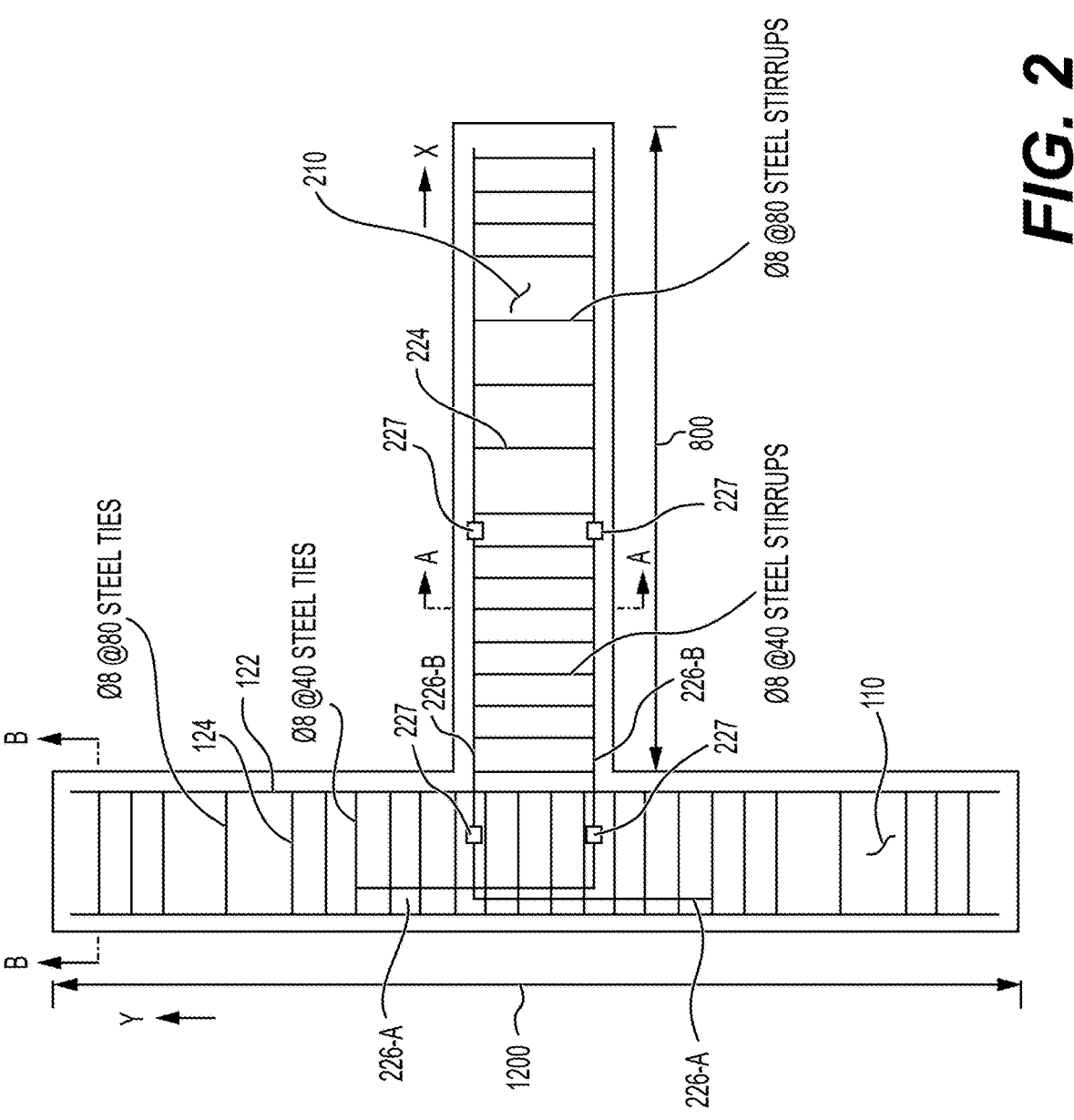
FIG. 2 is a schematic side view illustrating the reinforced concrete structure of FIG. 1.
Figure 4:
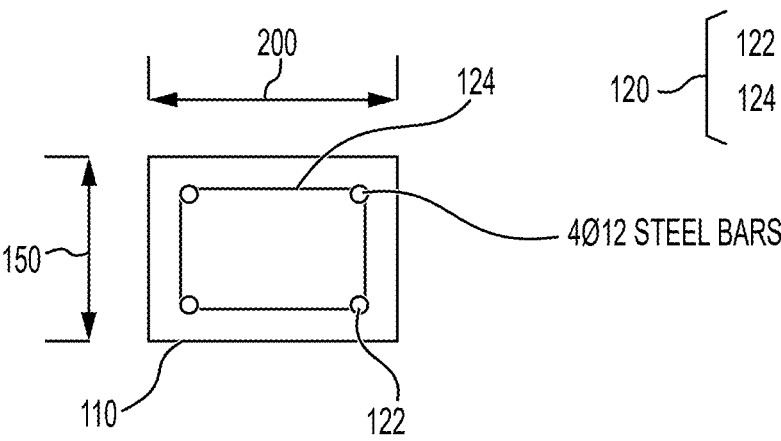
FIG. 4 is a cross-sectional view taken along line B-B of FIG. 2.

Referring to FIGS. 1, 2 and 4, the first structural member 100 includes a first concrete body 110 with at least one first metallic reinforcement member 120 embedded in the first concrete body 110.

The term "embedded" means that at least a portion of the at least one first metallic reinforcement member 120 extends inside of the first concrete body 110. However, and as illustrated in FIGS. 1-2, the entirety of the at least one first metallic reinforcement member 120 may extend inside of the first concrete body 110.

Figure 3:
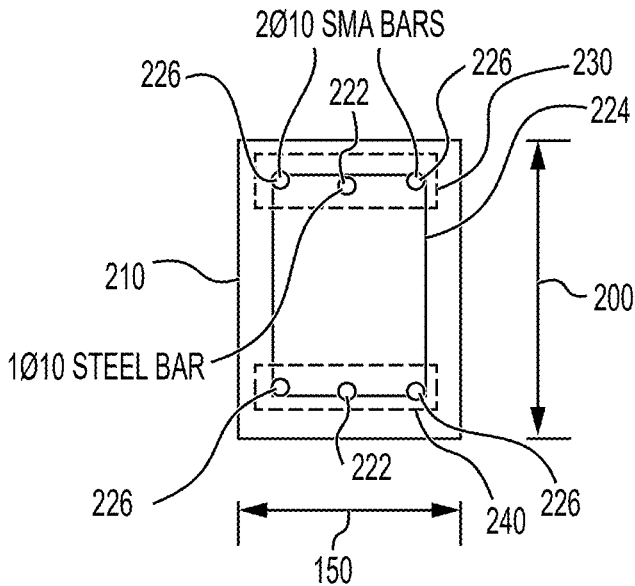
FIG. 3 is a cross-sectional view taken along line A-A of FIG. 2.

The at least one first metallic reinforcement member 120 may include a plurality of metallic bars 122 (see FIGS. 2-4, illustrating rebars 122) extending in a length direction of the first concrete body 110 (e.g., along the first direction Y) and a plurality of metallic ties or stirrups 124 (ties 124 in this case since the first structural member 100 is exemplarily illustrated as being a column) separated from one another along the length direction of the first concrete body 110.

The at least one first metallic reinforcement member 120 may be made of, for example, steel. As an example, the metallic bars 122 may be made of steel (e.g., steel rebars) and the metallic ties 124 may be made of steel (e.g., bent rebar, bent round or flat steel bar, etc.)

The plurality of metallic bars 122 may extend along substantially the entire length of the first concrete body 110 (which is about 1200 mm in the non-limiting example of FIGS. 1-4). The ties 124 can be spaced from one another by about 40 mm or by about 80 mm, depending on their location, as illustrated in FIG. 2.

The second structural member 200 may include:

a) a second concrete body 210;

b) a plurality of second metallic reinforcement members 226 embedded in the second concrete body 210 and extending in a length direction of the second concrete body 210 (e.g., along the second direction X). At least a portion of the length of the plurality of second metallic reinforcement members 226 is formed of (or includes) a smart memory alloy material;

c) at least one third metallic reinforcement member 222 embedded in the second concrete body 210, the at least one third metallic reinforcement member 222 extending in the length direction of the second concrete body 210; and d) a plurality of metallic ties or stirrups 224 (stirrups 224 in this case since the second structural member 200 is exemplarily illustrated as being a beam) separated from one another along the length direction of the second concrete body 210.

Each one of the second metallic reinforcement members 226 may extend along substantially the entire length of the second concrete body 210.

Figure 5:
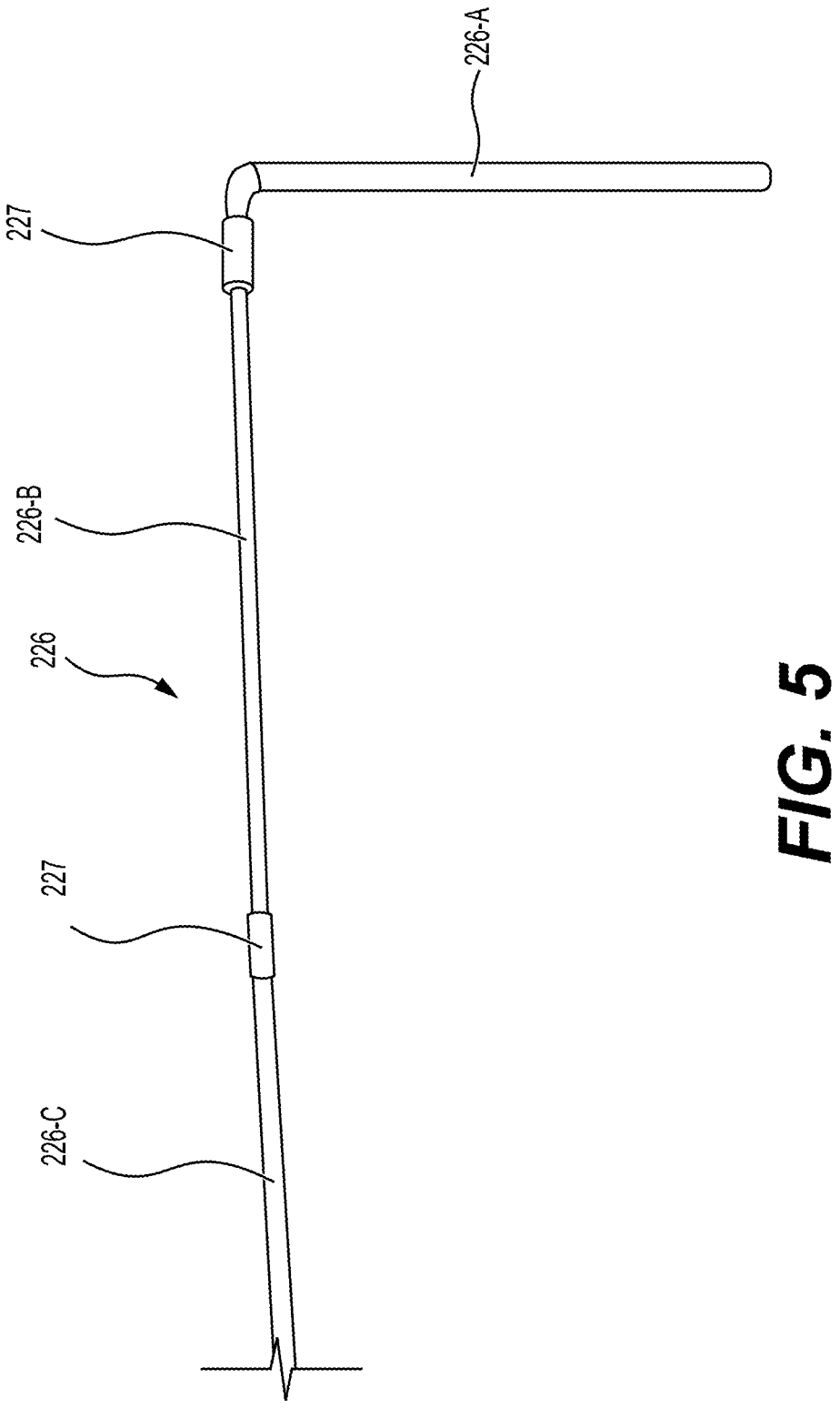
FIG. 5 is a top plan view illustrating a reinforcing member that includes a smart memory alloy, included in the reinforced concrete structure of FIG. 1.

FIG. 5 illustrates a second metallic reinforcement member 226 in isolation for clarity. Referring to FIG. 5, each second metallic reinforcement member 226 may include a first length portion 226-A made of steel or other non-smart alloy material (e.g., a steel rebar), a second length portion 226-B made of a smart memory alloy and a third length portion 226-C made of steel or other non-smart memory alloy (e.g., a steel rebar).

In certain embodiments, the smart memory alloy material forming the second length portion 226-B may be a nickel titanium (NiTi) alloy. Table 1 below illustrates the chemical composition of a NiTi alloy (in weight percentage) usable for making the second length portion 226-B of each second metallic reinforcement member 226.

TABLE 1

| Ni | Ti | O | C | Fe | Cr | Ca | Cu | N | Nb | H |
|---|---|---|---|---|---|---|---|---|---|---|
| 55.68% | 44.21% | 0.042% | 0.041% | 0.015% | 0.01% | 0.001% | 0.001% | 0.001% | 0.001% | 0.00011% |

The composition of the NiTi alloy of Table 1 is advantageous because it provides the second length portion 226-B of each second metallic reinforcement member 226 with a large strain recovery rate (about 6%). This means that the second length portion 226-B can be stretched by about 6% of its length (by subjecting it to a large tension force) and then return by itself to its initial shape, having incurred virtually no permanent deformation due to the stretching, when the tensile force is released.

Figure 6:
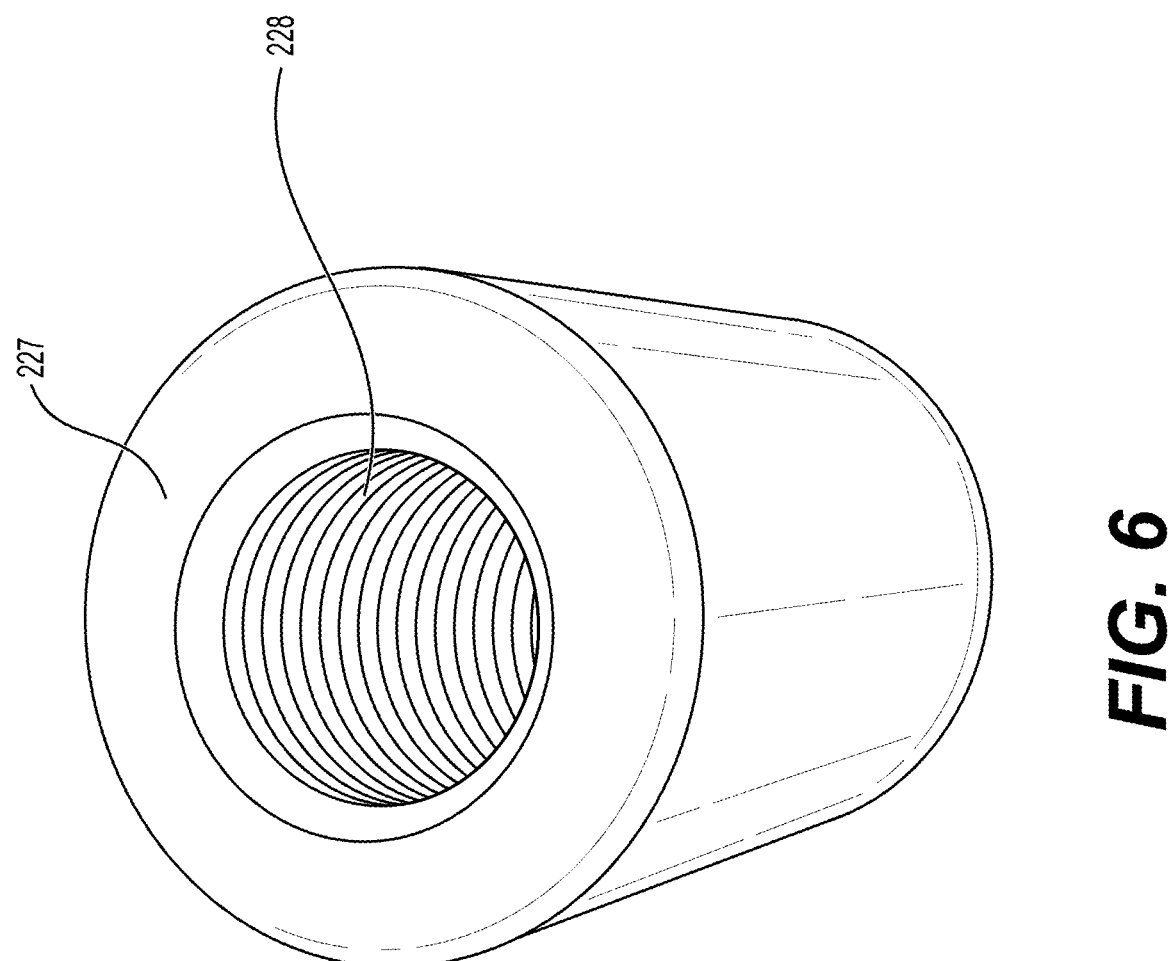
FIG. 6 is a perspective view illustrating a coupler included in the reinforcing member of FIG. 5.

Adjacent parts of the first and second length portions 226-A, 226-B may be threaded on their respective exteriors and may be joined to one another by a first coupler 227. See FIG. 6, illustrating an exemplary coupler 227, which includes an elongated tubular body with inner threads 228, for coupling the adjoining parts of the first and second length portions 226-A, 226-B.

Adjacent parts of the second and third length portions 226-B, 226-C may be threaded on their respective exteriors and joined to one another by a second coupler 227. Each coupler 227 included in each second metallic reinforcement member 226 may be made of a metal, for example, steel, and be sufficiently strong to maintain the first to third length portions 226-A to 226-C of each second metallic reinforcement member 226 connected to one another under the tensile and/or compressive loads that the first to third length portions 226-A to 226-C of each second metallic reinforcement member 226 are anticipated to experience when the reinforced concrete structure experiences load during use.

Each one of the second metallic reinforcement members 226 may extend in the second direction X along virtually the entire length of the second concrete body 210. In addition, each one of the second metallic reinforcement members 226 may extend, in the second direction X, along about half or about more than half of the width of the first concrete body 110.

The structural joint formed by the connection of the first and second structural members 100, 200 has a critical region. Said critical region includes about one-third of the length of the second concrete body 210 extending adjacent to the first concrete body 110, and about one-half of the width of the first concrete body 110 (measured along the second direction Y) extending adjacent to the second concrete body 210. Stated otherwise, the critical region of the joint includes about ⅓ of the length of the second concrete body 210 that extends from the face of the first concrete body 110, and about ½ of the width of the first concrete body 210 that extends inwardly (in the second direction X) from the interface between the first concrete body 210 and the second concrete body 210.

The second length portion 226-B of each second metallic reinforcement member 226 may extend along the critical region of the joint. Therefore, the second length portion 226-B of each second metallic reinforcement member 226 may extend in the second direction X along about one-half of the width of the first concrete body 110 that spans adjacent to the second concrete body 210, and may span in the second direction X along about one-third of the length of the second concrete body 210 that extends from the face (or exterior) of the second concrete body 210.

See FIG. 2, illustrating that a top second metallic reinforcement member 226 and a bottom second metallic reinforcement member 226 each include a second length portion 226-B extending in the second direction X by about one-half of the width of the first concrete body 110 that spans adjacent to the second concrete body 210, and extending in the second direction X by about one-third of the length of the second concrete body 210 located adjacent to the first concrete body 110.

The reinforcement of the critical region of the joint formed by the structure illustrated in FIGS. 1 and 2 by using the second metallic reinforcing members 226 as described in this specification, in combination with the at least one first metallic reinforcement member 120, the third metallic reinforcement members 222 and the stirrups 224 as taught by this specification, significantly increases the resistance of the joint to earthquake loads.

In particular, the ratio of the lateral cross-sectional area of the second and third metallic reinforcement members 226, 222, as will be described in detail below, is believed to contribute to the joint's high resistivity against the reversing cyclic loads produced by an earthquake.

A lateral cross-section is a cross-section taken in a direction that is lateral to the length direction of the structural member in question, from among the first and second structural members 100, 200. For example, FIG. 3 illustrates a lateral cross-section of the second structural member 200, taken along line A-A of FIG. 2.

Referring to FIG. 3, the plurality of second metallic reinforcement members 226 and the at least one third metallic reinforcement 222 member can be arranged in a first group of reinforcement members 230 and in a second group of reinforcement members 240.

The first group of reinforcement members 230 includes:
a) a first one and a second one of the plurality of second metallic reinforcement members 226; and
b) a first one of the at least one third metallic reinforcement member 222.

As illustrated in FIG. 3, in the first group of reinforcement members 230, the first one of the plurality of second metallic reinforcement members 226 (e.g., the second metallic reinforcement member 226 to the left), the second one of the plurality of second metallic reinforcement members 226 (e.g., the second metallic reinforcement member 226 to the right) and the first one of the at least one third metallic reinforcement member 222 can be arranged in a row.

As illustrated in FIG. 3, in the first group of reinforcement members 230, the first one of the plurality of second metallic reinforcement members 226, the second one of the plurality of second metallic reinforcement members 226 and the first one of the at least one third metallic reinforcement member 222 may be spaced apart from one another. The first one of the at least one third metallic reinforcement member 222 may be disposed between the first one and the second one of the plurality of second metallic reinforcement members 226.

In the lateral cross-section of the second structural member 200, ratio R1 applies to the first group of reinforcement members 230:

$$R1 = \frac{A1}{B1},$$

where A1 equals a sum of a cross-sectional area of the first one of the plurality of second metallic reinforcement members 226, the second one of the plurality of second metallic reinforcement members 226 and the first one of the at least one third metallic reinforcement member 222; and B1 equals a cross-sectional area of the first one of the at least one third metallic reinforcement member 222.

R1, as taught by this specification, ranges from about 3 to about 3.3.

In the non-limiting example of FIGS. 1-6, and in the first group of reinforcement members 230, the first one of the plurality of second metallic reinforcement members 226 has a diameter of about 10 mm, the second one of the plurality of second metallic reinforcement members 226 has a diameter of about 10 mm, and the first one of the at least one third metallic reinforcement member 222 has a diameter of about 9.6 mm.

As such, and for the first group of reinforcement members 230, R1 equals $$\frac{2 \times \left(\frac{\pi}{4} \times 10^2\right) + 1 \times \left(\pi/4 \times 9.6^2\right)}{1 \times \left(\pi/4 \times 9.6^2\right)} = 3.17$$

The second group of reinforcement members 240 may be similar or substantially the same as the first second group of reinforcement members 230. However, the second group of reinforcement members 240 may be disposed in a different area of the lateral cross-section of the second structural member 200 to resist stress that is opposite to the stress resisted by the first second group of reinforcement members 230. For example, when the loading on the second structural member 200 produces compression in the top half of the second concrete body 210 and tension in the bottom half of the second concrete body 210, the first second group of reinforcement members 230 is subjected to compression and the second second group of reinforcement members 240 is subjected to tension.

The second group of reinforcement members 240 includes:

a third one of the plurality of second metallic reinforcement members 226 and a fourth one of the plurality of second metallic reinforcement members 226; and a second one of the at least one third metallic reinforcement member 222.

In the second group of reinforcement members 240, the third one of the plurality of second metallic reinforcement members 226, the fourth one of the plurality of second metallic reinforcement members 226 and the second one of the at least one third metallic reinforcement member 222 may be arranged in a row and may be spaced apart from one another. See FIG. 3.

In the second group of reinforcement members 240, the second one of the at least one third metallic reinforcement member 222 may be disposed between the third one of the plurality of second metallic reinforcement members 226 and the fourth one of the plurality of second metallic reinforcement members 226.

In the lateral cross-section of the second structural member, ratio R2 applies to the second group of reinforcement members 240:

$$R2 = \frac{A2}{B2},$$

where A2 equals a sum of a cross-sectional area of the third one of second metallic reinforcement members 226, the fourth one of the plurality of second metallic reinforcement members 226 and the second one of the at least one third metallic reinforcement member 222; and B2 equals a cross-sectional area of the second one of the at least one third metallic reinforcement member 222.

R2 ranges from about 3 to about 3.3.

In the non-limiting example of FIGS. 1-6, and in the second group of reinforcement members 240, the third one of the plurality of second metallic reinforcement members 226 has a diameter of about 10 mm, the fourth one of the plurality of second metallic reinforcement members 226 has a diameter of about 10 mm, and the second one of the at least one third metallic reinforcement member 222 has a diameter of about 9.6 mm.

As such, and for the second group of reinforcement members 240, R2 equals $$\frac{2 \times \left(\frac{\pi}{4} \times 10^2\right) + 1 \times \left(\pi/4 \times 9.6^2\right)}{1 \times \left(\pi/4 \times 9.6^2\right)} = 3.17$$

Since each one of the first and second groups of reinforcement members 230, 240 has a ratio R1, R2 ranging from about 3 to about 3.3, the structural member 200 as a whole can have an R value of $$R = \frac{A}{B},$$

where A equals a sum of a cross-sectional area of the plurality of second metallic reinforcement members 226 and a cross-sectional area of the at least one third metallic reinforcement member 222 for the entire second structural member 200 (i.e., for the first and second groups of reinforcement members 230 and 240 combined); and B equals the cross-sectional area of the at least one third metallic reinforcement member 222 for the entire second structural member 200 (i.e., for the first and second groups of reinforcement members 230 and 240 combined), and R ranges from about 3 to about 3.3.

In the example of FIGS. 1-6, the value of R for the entire lateral cross-sectional area of the second structural member 200 is 3.17 (i.e., the same as R1 and the same as R2).

Since the second length portion 226-B of each second metallic reinforcement member 226 in the first and second groups of reinforcement members 230 and 240 extends into the second structural member 200 (from the face of the first structural member 100) by about ⅓ of the length of the second structural member 200 and into the first structural member 100 (from the end of the second structural member 200) by about ½ of the width of the first structural member 100, the ratios R, R1 and R2, as defined by this specification, apply across the entire critical region of the joint formed by the first and second structural members 100, 200.

As such, the critical region of the joint formed by the first and second structural members 100, 200 has great, i.e., improved, resistance to earthquake loads, particularly in comparison with a joint formed without the smart memory alloy of the present subject matter.

The high resistivity of the structure of FIGS. 1-6 was verified by comparing the resistance to simulated earthquake loads of an actual embodiment of the structure illustrated in FIGS. 1-6 with the resistance to simulated earthquake loads of a control structure that does not include smart memory alloys.

More specifically, the structure as illustrated in FIGS. 1-6 was built by using a lightweight concrete mix for constructing the first and second concrete bodies 110, 210 to the dimensions illustrated in FIGS. 2-4.

See table 2 below regarding the composition of the lightweight concrete mix.

TABLE 2

| Cement | Lightweight Coarse Aggregate | Lightweight Fine Aggregate | Silica Sand | Water | Super-plasticizer |
|---|---|---|---|---|---|
| 410 kg/m³ | 420 kg/m³ | 420 kg/m³ | 240 kg/m³ | 260 kg/m³ | 8 kg/m³ |

Accordingly, one meter cube of the lightweight cement mix weighed about 410 kg+420 kg+420 kg+240 kg+260 kg+8 kg=1,758 kg.

The dimensions and position of the metallic rebars 122, the metallic ties 124, the plurality of second metallic reinforcement members 226, the at least one third metallic reinforcement member 222 and the metallic stirrups 224 in the first and second concrete bodies 110, 120 was carried out per the teachings of this specification and as illustrated in FIGS. 2-4.

The resulting structure, which may be referred to as the structure of the present subject matter, was allotted sufficient time to cure. After curing, the structure of the present subject matter was affixed to an external rigid structure to prevent movement (e.g., slippage) of the structure of the subject matter during testing, and a dual-action hydraulic jack was connected to the cantilevered end of the second structural member 200.

The hydraulic jack was used to apply a reversing cyclic load at the end of the second structural member 200 along the first direction X (i.e., up and down), and the load increased in magnitude with each reversal (e.g., the jack pressed down on the end of the second structural member

200 by a first magnitude of force, then the jack pulled up the end of second structural member by a second magnitude of force, greater than the first magnitude). Strain/movement sensors were connected to the critical area of the joint to measure stresses, cracks formed, and movement in general at the critical area of the joint.

The control structure was formed to be identical to the structure of the present subject matter with the exception of the smart memory alloy (i.e., the plurality of second metallic reinforcement members 226) being replaced with non-smart alloy bars. Specifically, the 10 mm diameter second metallic reinforcement members 226 of the structure of the present subject matter were replaced with 9.6 mm diameter steel rebars, similar to the 9.6 mm diameter steel rebar used in forming the at least one third metallic reinforcement member 222 in the structure of the present subject matter.

All other aspects of the control structure were the same as the structure of the present subject matter (e.g., the control structure was formed of the same concrete type as the structure of the present subject matter, had the same dimensions and the same number of metallic reinforcement members as the structure of the present subject matter, etc.)

For clarification purposes, in the drawings, a callout indicating "1ϕ10 steel bar" means that one steel bar is called out, and said steel bar has a nominal diameter of 10 mm. The same method of reading callouts applies to FIGS. 2-4. A steel bar having a nominal diameter of 10 mm, in the case of the bars used for forming the structure of the present subject matter and the control structure, has an actual diameter of 9.6 mm. The second metallic reinforcement members 226, having the callout of "2ϕ10 SMA bars" in FIG. 2 have an actual diameter of about 10 mm at their smart memory alloy (second length portion 226-B) and an actual diameter of about 9.6 mm at their non-smart alloy portions 226-A and 226-C.

The control structure was allowed to cure and was tested in the same manner as the structure of the present subject matter until both structures failed under the stress produced by the reversing cyclic load of the dual action jack, which simulates loading on the structures due to an earthquake.

Table 3 below presents a comparison of the test results of the two structures.

TABLE 3

| | Control Structure | Structure of the Present Subject Matter |
|---|---|---|
| Self-centering | 46.2% | 81.9% (increase) |
| Residual Displacement | 28.0 mm | 9.4 mm (66.4% decrease) |
| Energy Dissipation | 12.7 kN · m | 11.5 kN · m (9% decrease) |
| Initial Stiffness | 1.95 kN/mm | 2.01 kN/mm (3% increase) |
| Load Capacity | 32.0 kN | 34.9 kN (9% increase) |
| Major Crack Width (at critical region) | 4.3 mm | 1.8 mm (58% decrease) |

The self-centering of each structure, which is defined as $$\frac{\text{Ultimate Displacement} - \text{Residual Displacement}}{\text{Ultimate Displacement}},$$

was measured to be about 81.9% for the structure of the present subject matter, which is significantly higher than the 46.2% value measured for the control structure. This parameter is desirable because it indicates that the structure of the present subject matter maintained its centering more closely than the control structure under load.

The residual (vertical) displacement of the cantilevered end of the structure of the present subject matter was measured to be 9.4 mm, which is a decrease of about 66.4% relative to the residual (vertical) displacement of the control structure (measured to be 28 mm). This parameter indicates that the cantilevered end of the structure of the present subject matter drooped significantly less than the cantilevered end of the control structure, which is a desirable outcome.

Referring to Table, 3, the energy dissipation of the structure of the present subject matter was about 9% lower than the energy dissipation of the control structure, the initial stiffness of the structure of the present subject matter was about 3% higher than the initial stiffness of the control structure, the load capacity of the structure of the present subject matter was about 9% higher than the load capacity of the control structure, and the major crack width of the structure of the present subject matter was about 58% lower than the major crack width of the control structure, all being favorable readings, indicating the superior resistance to earthquake loads of the structure of the present subject matter.

Stated otherwise, the teachings of this specification significantly minimize the damage that may occur to a structural lightweight concrete joint subjected to reversed cyclic loading. In addition, the teachings of this specification increase the self-centering ability of the structure of the present subject matter by approximately 77.3%, reduce residual displacement by about 66.4% and increase load capacity by about 9.1% while decreasing energy dissipation only slightly (by around 9.4%) in comparison to similar known concrete structural joints that omit smart memory alloy reinforcement.

While the structure of the FIGS. 1-4 is illustrated as having two smart memory alloy bars (second metallic reinforcement members 226) and one non-smart memory alloy bar (third metallic reinforcement member 222) per each group of reinforcement members 230, 240, the present disclosure is not limited to this configuration. The number of smart alloy bars can be greater than two in each group of reinforcement members 230, 240, and the number of non-smart alloy bars can be greater than one in each group of reinforcement members 230, 240 so long as the ratio R of about 3 to about 3.3 is maintained in each group of reinforcement members 230, 240. Specifically, in each group of reinforcement members 230, 240: (the sum of the lateral cross-sectional areas of all the smart alloy bars and non-smart alloy bars)/(the sum of the lateral cross-sectional areas of all of the non-smart alloy bars) must range from about 3 to about 3.3.

The joint formed by the structure illustrated in FIGS. 1-4 is illustrated to be a column-beam joint. However, the teachings of the present subject matter can also be applied to other types of joints in a reinforced concrete structure, merely as an example, in foundation-column joints.

In another embodiment, the present subject matter is directed to a method of forming a reinforced concrete structure, as is described in more detail below.

In this regard, the present subject matter further relates to a method of forming a reinforced concrete joint, which includes:

forming a first formwork for a first structural member. The formwork may be made of wooden planks, plywood, etc., to contain concrete that will be poured therein and to house metallic reinforcing bars inside along its length. The first formwork can be used to house the first structural member 100 inside. As such, the first formwork can be shaped and sized according to the size of the first structural member 100.

The method includes forming a second formwork for a second structural member, the second formwork intersecting the first formwork and extending in a different direction than the first formwork. The second formwork can be used to house the second structural member 200 inside. As such, the second formwork can be shaped and sized according to the size of the second structural member 200.

The method includes disposing at least one first metallic reinforcement member in the first formwork. For example, the method includes disposing at least one first metallic reinforcement member 120 inside of the first formwork.

The method includes disposing a plurality of second metallic reinforcement members 226 in the second formwork, the plurality of second metallic reinforcement members extending in a length direction of the second formwork. The plurality of second metallic reinforcement members 226 includes a smart memory alloy along at least a portion of a length thereof, as taught by this specification.

The method includes disposing at least one third metallic reinforcement member 222 in the second formwork, the at least one third metallic reinforcement member 222 extending in the length direction of the second formwork.

The method includes pouring concrete in the first formwork and pouring concrete in the second formwork.

In a lateral cross-section of the second formwork, taken along a portion of the second formwork that extends adjacent to the first formwork or at a certain distance from the first formwork, ratio R applies.

$$R = \frac{A}{B},$$

where A equals a sum of a cross-sectional area of the plurality of second metallic reinforcement members and a cross-sectional area of the at least one third metallic reinforcement member, and B equals the cross-sectional area of the at least one third metallic reinforcement member, and R ranges from about 3 to about 3.3.

The method may also include waiting a period of time for the concrete poured in the first and second formworks to cure and removing the first and second formworks to expose the reinforced concrete structure.

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. A structure comprising:
   a first structural member extending in a first direction; and
   a second structural member extending in a second direction, said second direction crossing the first direction, the first and second structural members being connected to one another;
   wherein the first structural member includes a first concrete body with at least one first metallic reinforcement member embedded in the first concrete body,
   wherein the second structural member includes:
      a second concrete body;
      a plurality of second metallic reinforcement members embedded in the second concrete body, the plurality of second metallic reinforcement members extending in a length direction of the second concrete body, wherein each one of the plurality of second metallic reinforcement members includes a smart memory alloy along at least a portion of a length thereof; and at least one third metallic reinforcement member embedded in the second concrete body, the at least one third metallic reinforcement member extending in the length direction of the second concrete body, wherein, in a lateral cross-section of the second structural member, taken along a portion of the second structural member that extends adjacent to the first structural member or at a distance from the first structural member, ratio R applies, wherein $$R = \frac{A}{B},$$

wherein A equals a sum of a cross-sectional area of the plurality of second metallic reinforcement members and a cross-sectional area of the at least one third metallic reinforcement member, and B equals the cross-sectional area of the at least one third metallic reinforcement member, and wherein R ranges from about 3 to about 3.3, wherein the plurality of second metallic reinforcement members and the at least one third metallic reinforcement member are arranged in a first group of reinforcement members and in a second group of reinforcement members, wherein the second group of reinforcement members includes:

a third one and a fourth one of the plurality of second metallic reinforcement members; and a second one of the at least one third metallic reinforcement member, wherein, in the lateral cross-section of the second structural member, ratio R2 applies, wherein $$R2 = \frac{A2}{B2},$$

wherein A2 equals a sum of a cross-sectional area of the third one of the plurality of second metallic reinforcement members, the fourth one of the plurality of second metallic reinforcement members and the second one of the at least one third metallic reinforcement member, and B2 equals a cross-sectional area of the second one of the at least one third metallic reinforcement member, and wherein R2 ranges from about 3 to about 3.3, wherein a lightweight concrete mix used for forming at least one selected from the group consisting of the first and second concrete bodies includes:

410 kg/m³ cement;

420 kg/m³ lightweight coarse aggregate;

420 kg/m³ lightweight fine aggregate;

240 kg/m³ silica sand;

260 kg/m³ water; and 8 kg/m³ Superplasticizer.

2. The structure of claim 1, wherein R equals about 3.17.

3. The structure of claim 1, wherein the plurality of second metallic reinforcement members and the at least one third metallic reinforcement member are arranged in a row and spaced apart from one another.

4. The structure of claim 3, wherein the row includes:

a first one and a second one of the plurality of second metallic reinforcement members; and a first one of the at least one third metallic reinforcement member.

5. The structure of claim 4, wherein the first one of the at least one third metallic reinforcement member is arranged between the first one and the second one of the plurality of second metallic reinforcement members.

6. The structure of claim 1, wherein the first group of reinforcement members includes:

a first one and a second one of the plurality of second metallic reinforcement members; and a first one of the at least one third metallic reinforcement member, wherein, in the lateral cross-section of the second structural member, ratio R1 applies, wherein $$R1 = \frac{A1}{B1},$$

wherein A1 equals a sum of a cross-sectional area of the first one of the plurality of second metallic reinforcement members, the second one of the plurality of second metallic reinforcement members and the first one of the at least one third metallic reinforcement member, and B1 equals a cross-sectional area of the first one of the at least one third metallic reinforcement member, and wherein R1 ranges from about 3 to about 3.3.

7. The structure of claim 6, wherein R1 equals about 3.17.

8. The structure of claim 6, wherein, in the first group of reinforcement members, the first one of the plurality of second metallic reinforcement members, the second one of the plurality of second metallic reinforcement members and the first one of the at least one third metallic reinforcement member are spaced apart from one another, and wherein the first one of the at least one third metallic reinforcement member is disposed between the first one and the second one of the plurality of second metallic reinforcement members.

9. The structure of claim 8, wherein the first one of the plurality of second metallic reinforcement members, the second one of the plurality of second metallic reinforcement members and the first one of the at least one third metallic reinforcement member are arranged in a row.

10. The structure of claim 6, wherein, in the second group of reinforcement members, the third one of the plurality of second metallic reinforcement members, the fourth one of the plurality of second metallic reinforcement members and the second one of the at least one third metallic reinforcement member are spaced apart from one another, and the wherein the second one of the at least one third metallic reinforcement member is disposed between the third one of the plurality of second metallic reinforcement members and the fourth one of the plurality of second metallic reinforcement members.

11. The structure of claim 10, wherein the third one of the plurality of second metallic reinforcement members, the fourth one of the plurality of second metallic reinforcement members and the second one of the at least one third metallic reinforcement member are arranged in a row.

12. The structure of claim 1, wherein the smart memory alloy of the plurality of second metallic reinforcement members includes nickel and titanium.

13. The structure of claim 12, wherein the smart memory alloy includes about 55.68% by weight nickel and about 44.21% by weight titanium.

14. The structure of claim 1, wherein at least one selected from the group consisting of the plurality of second metallic reinforcement members and the at least one third metallic reinforcement member further extends into the first concrete body of the first structural member by about half of a width of the first concrete body, thereby being embedded in said first concrete body.

15. A method of forming a reinforced concrete structure, comprising:

forming a first formwork for a first structural member;

forming a second formwork for a second structural member, the second formwork intersecting the first formwork and extending in a different direction than the first formwork;

disposing at least one first metallic reinforcement member in the first formwork;

disposing plurality of second metallic reinforcement members in the second formwork, the plurality of second metallic reinforcement members extending in a length direction of the second formwork, wherein the plurality of second metallic reinforcement members includes a smart memory alloy along at least a portion of a length thereof;

disposing at least one third metallic reinforcement member in the second formwork, the at least one third metallic reinforcement member extending in the length direction of the second formwork;

pouring concrete in the first formwork; and pouring concrete in the second formwork, wherein, in a lateral cross-section of the second formwork, taken along a portion of the second formwork that extends adjacent to the first formwork or at a distance from the first formwork, ratio R applies, wherein $$R = \frac{A}{B},$$

wherein A equals a sum of a cross-sectional area of the plurality of second metallic reinforcement members and a cross-sectional area of the at least one third metallic reinforcement member, and B equals the cross-sectional area of the at least one third metallic reinforcement member, and wherein R ranges from about 3 to about 3.3, wherein the plurality of second metallic reinforcement members and the at least one third metallic reinforcement member are arranged in a first group of reinforcement members and in a second group of reinforcement members, wherein the second group of reinforcement members includes:

a third one and a fourth one of the plurality of second metallic reinforcement members; and a second one of the at least one third metallic reinforcement member, wherein, in the lateral cross-section of the second formwork, ratio R2 applies, wherein $$R2 = \frac{A2}{B2},$$

wherein A2 equals a sum of a cross-sectional area of the third one of the plurality of second metallic reinforcement members, the fourth one of the plurality of second metallic reinforcement members and the second one of the at least one third metallic reinforcement member, and B2 equals a cross-sectional area of the second one of the at least one third metallic reinforcement member, and wherein R2 ranges from about 3 to about 3.3, wherein the concrete poured in at least one formwork selected from the group consisting of the first formwork and the second formwork for forming at least one selected from the group consisting of a first concrete body of the first structural member and a second concrete body of the second structural member, is a lightweight concrete mix, said lightweight concrete mix including:

410 kg/m$^3$ cement;

420 kg/m$^3$ lightweight coarse aggregate;

420 kg/m$^3$ lightweight fine aggregate;

240 kg/m$^3$ silica sand;

260 kg/m$^3$ water; and 8 kg/m$^3$ Superplasticizer.

16. The method of claim 15, further comprising:

waiting a period of time for the concrete poured in the first and second formworks to cure; and removing the first and second formworks.

17. The method of claim 15, wherein the smart memory alloy includes nickel and titanium.

* * * * *